UNITED STATES PATENT OFFICE.

CARL SORGER, OF WILMINGTON, DELAWARE.

PROCESS FOR THE MANUFACTURE OF A TANNING MATERIAL.

1,414,312.  Specification of Letters Patent.  Patented Apr. 25, 1922.

No Drawing.  Application filed June 25, 1921. Serial No. 480,471.

*To all whom it may concern:*

Be it known that I, CARL SORGER, a citizen of the Republic of Germany, residing at Wilmington, in the county of New Castle and State of Delaware, have invented new and useful Improvements in the Processes for the Manufacture of a Tanning Material.

The invention proposes separating the tanning material from the cellulose sulphite in such a way that a yellow brown colloidal powder is obtained which precipitates albuminous solutions and converts hide into leather without the addition of any other tanning materials. From the mother liquors, an adhesive is obtained.

The process consists in treating a thickened cellulose sulphite liquor with such a quantity of alkali bi-sulphate as will precipitate the whole amount of lignin sulphonic acid contained in the liquor in the form of alkali salts, in separating the resulting precipitate from the mother liquor, dissolving it in a small quantity of water, subjecting the solution to dialysis in order to remove the small amounts of crystalloidal salts and concentrating the dialyzed solution by evaporation or bringing it to dryness. The acid mother liquors yield the adhesive after they are neutralized and the salts removed.

Since the tanning action of cellulose liquors has been known, many experiments have been made to utilize them to the greatest advantage possible. The liquor was used acid and also in the form of metallic salts. In this connection, it is specified in German Patent 75351 that the metallic salts of the tanning acid can be produced by precipitating the liquor with alum, alkali mono-sulphate or bi-sulphate, while according to the process described in German Patent 281453, the free lignin sulphonic acid is obtained by treating the liquor with sulphuric acid. In the German Patent 313150, it is further proposed to obtain the salts of lignin sulphonic acid in the liquor, as well as the free lignin sulphonic acid by adding suitable quantities of acid alkali salts without letting the liquor become acid with mineral acid. The process of the American Patent 1080970 also uses sulphuric acid and acid alkali salts (alkali sulphates) in order to obtain a part of the lignin sulphonic acid in the liquor free in solution. Finally, according to the process described in the American Patent 1,043,303, a gelatinous substance of a thin character is obtained from the sulphite liquor by using an electrolyte (sodium chloride), in which process, however, no precipitation occurs and no acid is used. These gelatins are mixed with the sulphite liquor which had been treated with oxalic acid and only then can they be used as a tanning material.

In the present process, alkali salts are also used, but they do not serve the purposes outlined above but are used in much larger quantities to precipitate the tanning material which separates out in the form of a yellow-brown powder. In order to separate the mother liquor, which contains certain adhesives such as pectin materials, other carbohydrates and metallic salts, the precipitate is filtered off, pressed and washed with a small quantity of cold water. Since the precipitate coagulates at 50-60°, most of the mother liquor can be removed by this means.

In order to remove completely the small amounts of crystalloidal salts, the precipitate is dissolved in a small quantity of water and dialyzed with running water until no salts can be detected in the water running off. By evaporating the dialyzed solution, either a thick liquor is obtained, or upon further evaporation, a yellow-brown powder, which has a content of tanning material assimilable by the hide amounting to 45%, a tanning content which has never been attained heretofore from any liquor extracts. As for the rest, it is already known (of German Patent 73161, Class 2) that raw sulphite liquors are subjected to dialysis for the purpose of separating the calcium salts of lignin sulphonic acid from a fermentable organic substance. The dialyzed solution is then decalcified by adding sulphuric acid and converted into free lignin sulphonic acid. In the present process, on the other hand, a substance or its solution is subjected to dialysis only in order to free it from crystal salts. The acid mother liquors of the alkali salts are neutralized with calcium or sodium carbonate, filtered from the gypsum precipitate, and concentrated until the sodium salt crystallizes. The filtrate thus obtained, a thick liquor of 34° Bé., serves as an adhesive which can be clarified, if necessary, by means of a reduction agent.

*Example 1.*

A solution of 650 parts crystallized sodium sulphate and 180 parts sulphuric acid of 60° Bé. is stirred into 1,000 parts cellulose sulphite liquor at 30° C. after several hours, it is filtered off, pressed and dissolved in a small quantity of water. The solution is dialyzed in running water. The water flowing off from the dialysis is tested as to the presence of sulphuric acid. The salts crystallizing out of the mother liquor are used over again.

*Example 2.*

If the acid mother liquors of the two examples given above are neutralized with 120 parts calcium or sodium carbonate, filtered off from the gypsum precipitate, and concentrated to the point when the sodium salts begin to crystallize out, a thick liquor of 34° Bé. is obtained after filtration, which may be used as an adhesive. If necessary, it is clarified with 1 to 2 parts formaldehyde sulfoxylate until it forms a honey-like mass.

Claims:

1. Process for the manufacture of a tanning material from sulphite liquor which consists in treating the thickened liquor with so much acid sulfate of alkali salt that the whole ligno-sulfonic acid is precipitated as alkali salt.

2. Process for the manufacture of a tanning material from sulphite liquor which consists in pressing out the precipitate obtained under claim 1, dissolving it in water, dialyzing the filtrated solution and evaporating.

Dr. CARL SORGER.

Witnesses:
OTTO ALLEMANN,
J. B. WHITNEY.